Aug. 11, 1936.  E. P. FISHER  2,050,300
MANUFACTURE OF LAMINATED GLASS
Filed May 6, 1933
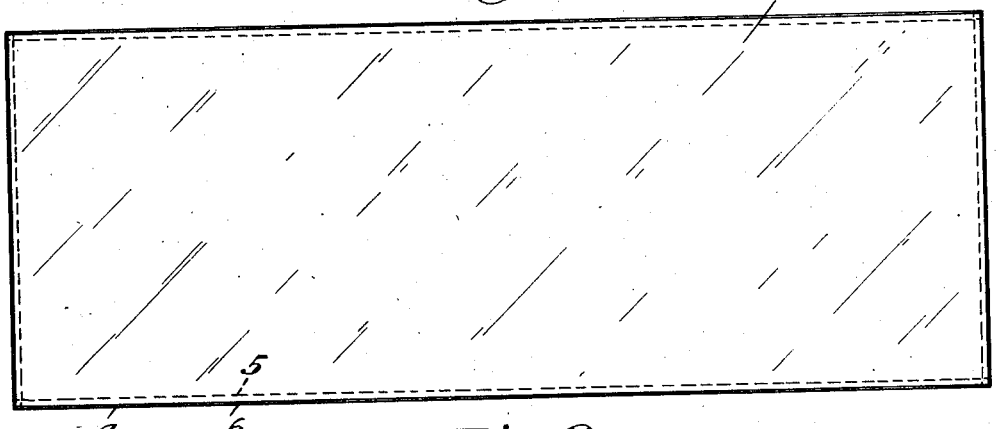
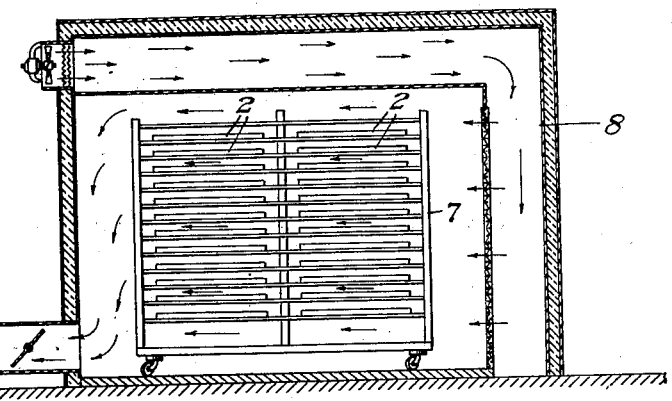
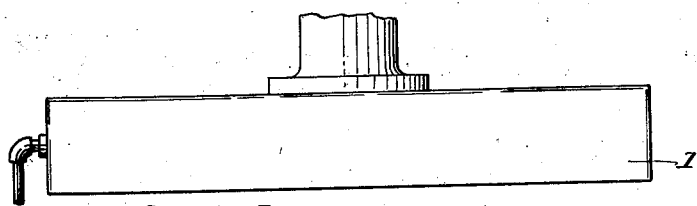
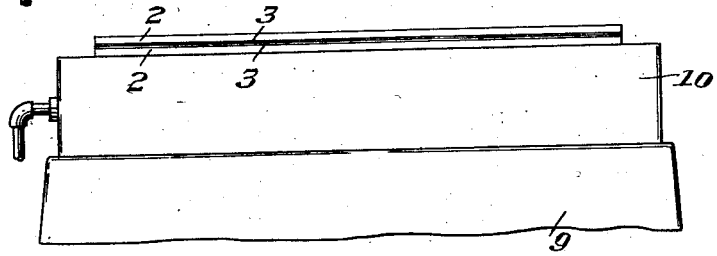
INVENTOR
Earl P. Fisher
By Byrnes, Stebbins,
Parmelee + Blenko
Attorneys Patented Aug. 11, 1936

2,050,300

UNITED STATES PATENT OFFICE 2,050,300

MANUFACTURE OF LAMINATED GLASS

Earl P. Fisher, Jeannette, Pa., assignor to American Window Glass Company, Pittsburgh, Pa., a corporation of Pennsylvania Application May 6, 1933, Serial No. 669,738

2 Claims. (Cl. 91—68)

My invention relates to the manufacture of laminated glass wherein a layer of a strengthening material is poured or flowed on one or both of the glass sheets to be united to form the composite. Where the strengthening material is either poured or flowed on the glass sheets, considerable difficulty has been experienced in preventing the material from flowing over the edges of the glass sheets. Various types of forms have been proposed to prevent the strengthening material from flowing over the edges of the glass sheets, but they have all been cumbersome and could not be satisfactorily used in the commercial practice of the manufacture of laminated glass by the use of a liquid strengthening material.

By my invention I provide for the formation of a frame or dam on each glass sheet on which the strengthening material is to be flowed. The dam or frame which I provide extends around the edges of the glass sheet and, of course, projects above the top surface thereof sufficient distance to prevent the material flowed on the glass sheet from flowing over the edges thereof.

The dam which I provide comprises a plurality of gummed strips of paper or other suitable material which are secured to the bottom side of the glass sheet adjacent the edges thereof or secured to the edges of the glass sheet. The gummed strips of paper or other suitable material, in view of the wetting for the purpose of securing them to the bottom face of the glass sheet, will naturally turn up around the edges of the glass sheet in drying and form a dam or frame projecting above the top surface of the glass sheet. The strips adjacent the corners of the glass sheet may be suitably folded or cut in order to prevent the escape of material from the top surface of the glass sheet through any openings in the frame or dam adjacent such corners.

After the paper frame or dam is formed on the glass sheet in the manner above described, the layer of strengthening material is flowed on the glass sheet and dried, and the coated sheet united to a second sheet by pressure. The paper frames will, of course, be removed between the drying operation and the assembling of the sheets into the composite product.

In the accompanying drawing—

Figure 1 is a plan view of the sheet to which my improved frame or dam has been applied;

Figure 2 is a longitudinal sectional view through the sheet shown in Figure 1, and having a layer of strengthening material thereon;

Figure 3 is a sectional view through a drying apparatus which may be used for drying the glass sheets after coating; and Figure 4 is a diagrammatic illustration of a press.

In carrying out my invention, each glass sheet 2 is provided with a dam or frame for preventing the layer of strengthening material 3 from flowing over the edges of the glass sheet.

The frame or dam 4, which comprises a plurality of gummed strips of paper or other suitable material, has a horizontally projecting portion 5 and a vertically projecting portion 6. The vertically projecting portion 6 of the dam extends above the top surface of the glass sheet sufficient distance to extend slightly above the top of the layer of strengthening material flowed on the sheet. As stated above, the strips are suitably cut at the corners of the glass sheet to form a continuous dam extending completely around the glass sheet. The strips are wetted and the horizontally projecting portion 5 stuck to the bottom face of the glass sheet. The side portions 6 then will naturally curl up around the edges of the glass sheet, or they may be turned upwardly so as to project vertically along the edges of the sheet.

After the layer of strengthening material is flowed on the top surface of the glass sheet, the glass sheets are placed on a rack 7 in an oven 8 and the layer of strengthening material dried.

Thereafter, the frame or dam is removed from the glass sheets and two coated glass sheets placed together with the strengthening layers 3 in juxtaposed relationship.

Thereafter, the assembled sheet of laminated glass is subjected to pressure by means of a press 9 having heated platens 10. The method of uniting the glass sheets or drying the layer of strengthening material form no part of my invention, and will not be specifically described.

While I have described a preferred method of carrying out my invention, it will be understood that I do not intend to be limited thereby, but that my invention may be otherwise practiced within the scope of the following claims.

I claim:

1. In the manufacture of laminated glass, the steps comprising forming a dam of flexible material on the bottom surface of a glass sheet and extending around the edges thereof and causing it to curl around said edges and extend above the top surface of said sheet, forming a layer of a solution of a strengthening material on the top surface of said glass sheet, drying the layer of strengthening material, and thereafter removing the dam from the glass sheet.

2. In the manufacture of laminated glass, the steps comprising forming a paper dam of flexible material on the bottom surface of a glass sheet extending around the edges thereof and causing it to curl around said edges and extend above the top surface of said sheet, forming a layer of a solution of a strengthening material on the top surface of said glass sheet, drying the layer of strengthening material, and thereafter removing the dam from the glass sheet.

EARL P. FISHER.